(12) United States Patent
Jaervelaeinen et al.

(10) Patent No.: US 7,667,420 B2
(45) Date of Patent: Feb. 23, 2010

(54) POSITION SENSOR SYSTEM

(75) Inventors: Tero Jaervelaeinen, Buehl (DE); Gilles Schmitt, Strasbourg (DE)

(73) Assignee: Robert Bosch GmbH, Stuttgart (DE)

( * ) Notice: Subject to any disclaimer, the term of this patent is extended or adjusted under 35 U.S.C. 154(b) by 117 days.

(21) Appl. No.: 11/885,921

(22) PCT Filed: Feb. 6, 2006

(86) PCT No.: PCT/EP2006/050685

§ 371 (c)(1),
(2), (4) Date: Apr. 24, 2008

(87) PCT Pub. No.: WO2006/103132

PCT Pub. Date: Oct. 5, 2006

(65) Prior Publication Data

US 2008/0238412 A1    Oct. 2, 2008

(30) Foreign Application Priority Data

Mar. 31, 2005  (DE) .................. 10 2005 015 141

(51) Int. Cl.
*H02K 29/08* (2006.01)
(52) U.S. Cl. ............................. 318/400.38; 318/400.16
(58) Field of Classification Search ............ 318/400.38, 318/400.16; 340/431, 686.1; 324/207.2
See application file for complete search history.

(56) References Cited

U.S. PATENT DOCUMENTS

2006/0169093 A1 *  8/2006  Peniston et al. ................ 74/514

FOREIGN PATENT DOCUMENTS

DE    100 54 530    2/2002

OTHER PUBLICATIONS

"Power Thermal Function Generator", Jan. 1, 1991, pp. 416-419, Vo. 33. No. 8, IBM Technical Disclosure Bulletin, IBM Corp., New York.

* cited by examiner

*Primary Examiner*—Karen Masih
(74) *Attorney, Agent, or Firm*—Kenyon & Kenyon LLP

(57) ABSTRACT

A position sensor system for detecting an absolute angular position of a rotor axle of an electric motor at a predetermined angular resolution W. The position sensor system include, a first Hall sensor device having a first sensor magnet set-up, set up on the rotor axle, and two first Hall sensors, which are set up at an angular offset with respect to the rotor axle so as to achieve a position angle resolution of 90°, and having a second sensor magnet set-up, set up on rotor axle, having n pole pairs and a number m of second Hall sensors, which are set up at an angular offset to one another with respect to the rotor axle, the set-up and the number n of pole pairs and the set-up and the number m of the second Hall sensors being selected so as clearly to detect angular segments at the predetermined angular resolution W within the angular range of the angular offset of 90°.

7 Claims, 4 Drawing Sheets

POSITION SENSOR SYSTEM

FIELD OF THE INVENTION

The present invention relates to a position sensor system for detecting an absolute electrical angular position of a rotor axle of an electric motor at a predetermined angular resolution. The present invention furthermore relates to a motor control system having an EC motor, which is controlled with the aid of such a position sensor system.

BACKGROUND INFORMATION

For detecting the position of and activating block-commutated EC motors, three Hall sensors providing digital signals are typically used. In a one-pole pair sensor magnet set-up, for example, the three Hall sensors provide a clear assignment to six position regions, each of which has 60°. This detection of the absolute electrical position ensures that the positional angle (i.e., the electrical position of the rotor with respect to the position regions) may be clearly identified already when switching on the EC motor such that an EC motor having a number of stator coils can be activated in an optimal manner. If a more precise detection of the positional angle is required or if special types of commutation (150° block length instead of the usual 120° or 180° block length) are to be used, then it may be necessary to double the resolution of the position regions such that twelve position regions are provided for one electrical revolution, each of which have a magnitude of 30°.

Previous position sensor systems having an angular resolution of 30° have, in addition to a first Hall sensor device having the three Hall sensors and the one-pole pair sensor magnet set-up, a second Hall sensor device, which has two second Hall sensors and one second three-pole pair sensor magnet set-up. In this instance, the total number of required Hall sensors is five. This increases the costs and the manufacturing expenditure of the position sensor system.

SUMMARY

An object of the present invention is to provide a position sensor system for detecting an absolute angular position in which the number of Hall sensors is reduced.

It is furthermore an object of the present invention to provide a position sensor system for a motor control system by which an EC motor may be activated in a simple manner.

According to a first example aspect of the present invention, a position sensor system is provided for detecting an absolute electrical angular position of a rotor axle of an electric motor at a predetermined angular resolution. The position sensor system includes a first Hall sensor device, which has a first sensor magnet set-up, set up on the rotor axle, having a number j of pole pairs and two first Hall sensors, which are physically set up with respect to the rotor axle at an angular offset of 90° divided by the number j of pole pairs so as to achieve a resolution of the electrical angular position of 90°. The position sensor system includes a second Hall sensor device, which has a second sensor magnet set-up, set up on the rotor axle, having n pole pairs and a number m of second Hall sensors, which are set up at an angular offset to one another with respect to the second rotor axle, the set-up and the number n of pole pairs and the set-up and the number m of Hall sensors being provided in order clearly to detect angular segments at the predetermined angular resolution within the angular offset of the first Hall sensors.

Such a position sensor system makes it possible to detect the absolute electrical angular position at a reduced number of Hall sensors in the first and second Hall sensor device as compared to position sensor systems having the same resolution as a conventional system.

Thus, one specific embodiment of the present invention provides for the first sensor magnet set-up to be implemented as a one-pole pair design and the second sensor magnet set-up to have three pole pairs and two second Hall sensors to be provided in the second Hall sensor device, the two Hall sensors being set up at an angle of 30° electrical to each other with respect to the rotor axle. In this manner, it is possible to implement a position sensor system having a predetermined angular resolution of 30° electrical, which has only four Hall sensors and thus fewer than conventionally provided.

Preferably at least one of the two Hall sensors is set up at the same angle with respect to the rotor axle as one of the first Hall sensors. This allows for the angular segments within the position angle resolution (electrical) of 90° to have the same size. Alternatively, one of the second Hall sensors may be set up at the same angle with respect to the rotor axle as a boundary region between the poles of the pole pair of the first sensor magnet set-up.

Furthermore, an evaluation unit may be provided, which is connected to the first and to the second Hall sensors, in order to provide the absolute angular position as a function of output signals of the Hall sensors.

According to another aspect of the present invention, a motor control system may be provided having an EC motor having a rotor axle and having a position sensor system. In this instance, the Hall sensor devices are set up on the rotor axle in such a way that a change in the detected absolute angular position ascertained by the evaluation unit is used as a trigger for a commutation of the EC motor.

BRIEF DESCRIPTION OF THE DRAWINGS

Preferred specific embodiments of the present invention are explained in greater detail in light of the figures.

FIG. 2b shows a signal-time diagram for the output signals of the Hall sensors of the position sensor system of FIG. 2a.

FIG. 3b shows a signal-time diagram of the output signals of the Hall sensors of the position sensor system of FIG. 3a.

DETAILED DESCRIPTION OF EXAMPLE EMBODIMENTS

Figure 1:
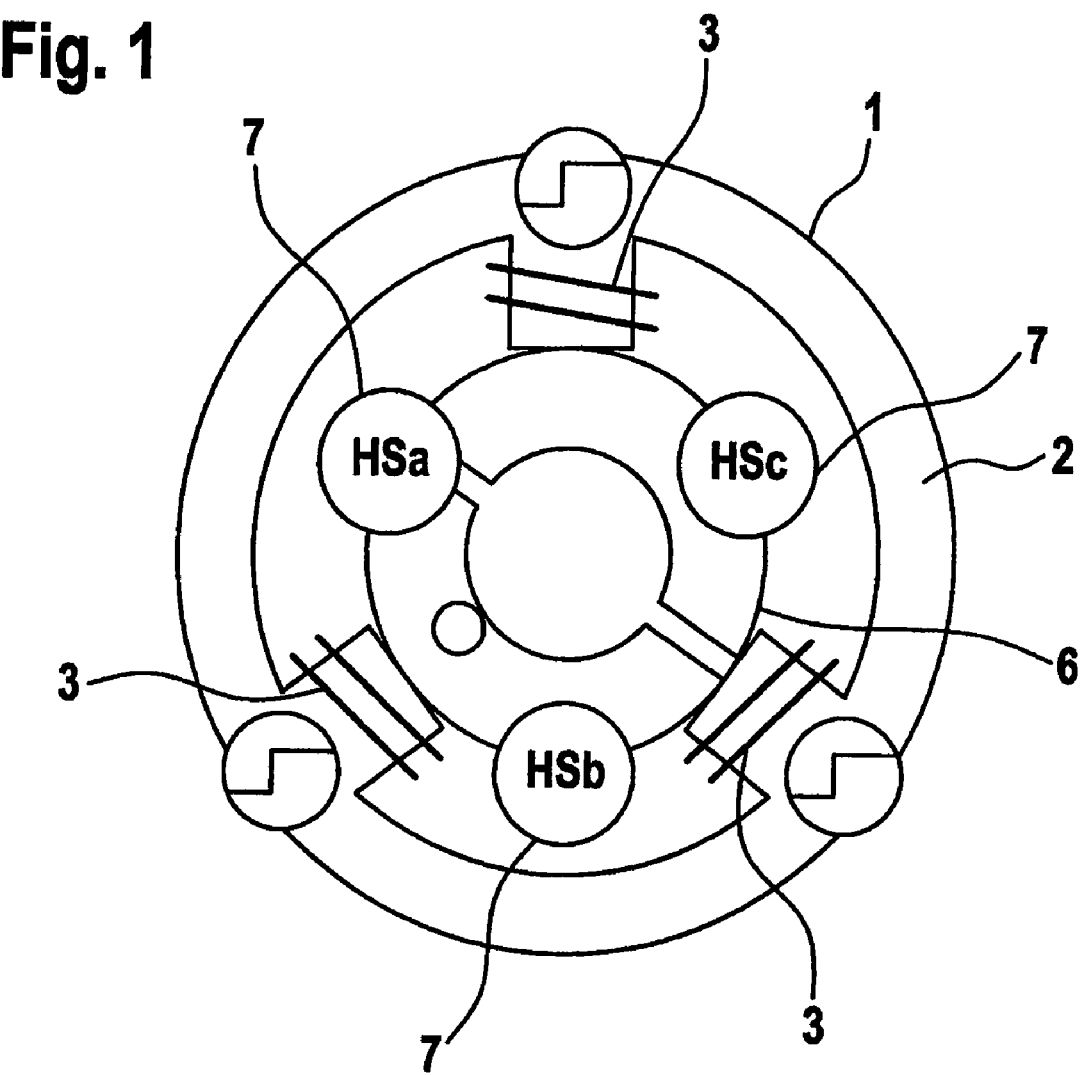
FIG. 1 shows a schematic view of an EC motor having a conventional position sensor system.

FIG. 1 shows a schematic representation of a motor system 1, which has a rotor axle 4 and a stator 2, on which three stator coils 3 are set up at an angular offset of 120°. On rotor axle 4 situated in the interior of stator 2 there is a one-pole pair or multi-pole pair permanent magnet set-up (not shown), which acts together with stator coils 3 on stator 2 so as to bring about a rotary motion of the rotor.

A position sensor system is situated on rotor axle 4, which has a first sensor magnet set-up 6. For the sake of clarity, the poles of the pole pairs of the sensor magnet set-up are shown in the representations as separated from each other by a line. Near first sensor magnet set-up 6, Hall sensors 7 are set up in such a way that the poles of first sensor magnet set-up 6 glide along Hall sensors 7 when the rotor axle is turning, a signal edge being generated when there is a change in the polarity of first sensor magnet set-up 6, which runs past the respective Hall sensor 7.

The sensor magnet set-up normally has the same number of pole pairs as the permanent magnet set-up. The permanent magnet set-up may also be used as a sensor magnet set-up.

A position sensor system having one one-pole pair sensor magnet set-up and three Hall sensors 7, which have an angular offset of 120° with respect to rotor axle 4, allows for an angular resolution of 60°, which is sufficient to commutate coil set-ups 3 in a suitable manner.

When changing the type of commutation of the EC motor or if for other reasons a more precise position angle detection is required, it may be necessary to improve the resolution of the position sensor system. For this purpose, as shown schematically in FIG. 2*a*, it is possible to provide the position sensor system in FIG. 1 with two additional Hall sensors 10 and an additional sensor magnet set-up 11 so as to double the angular resolution from 60° to 30°. In this instance, one of the additional Hall sensors 10 is set up with respect to one of Hall sensors 7 on the first sensor magnet set-up at the same phase angle. The angular offset between the additional Hall sensors 10 is 30° with respect to the rotor axle. In contrast to first sensor magnet set-up 6, second sensor magnet set-up 11 has three pole pairs, which are configured in each case as circular segments, each of which take up an angular range of 60° and are not phase-offset with respect to the pole pair of first sensor magnet set-up 6.

Figure 2A:
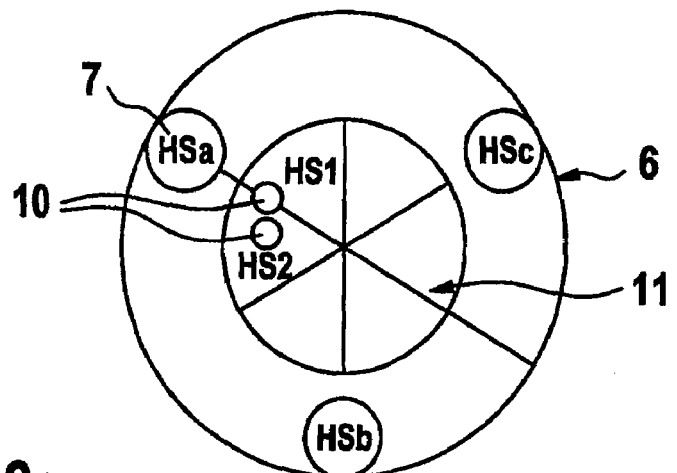
FIG. 2a shows a conventional position sensor system for an EC motor.
Figure 2B:
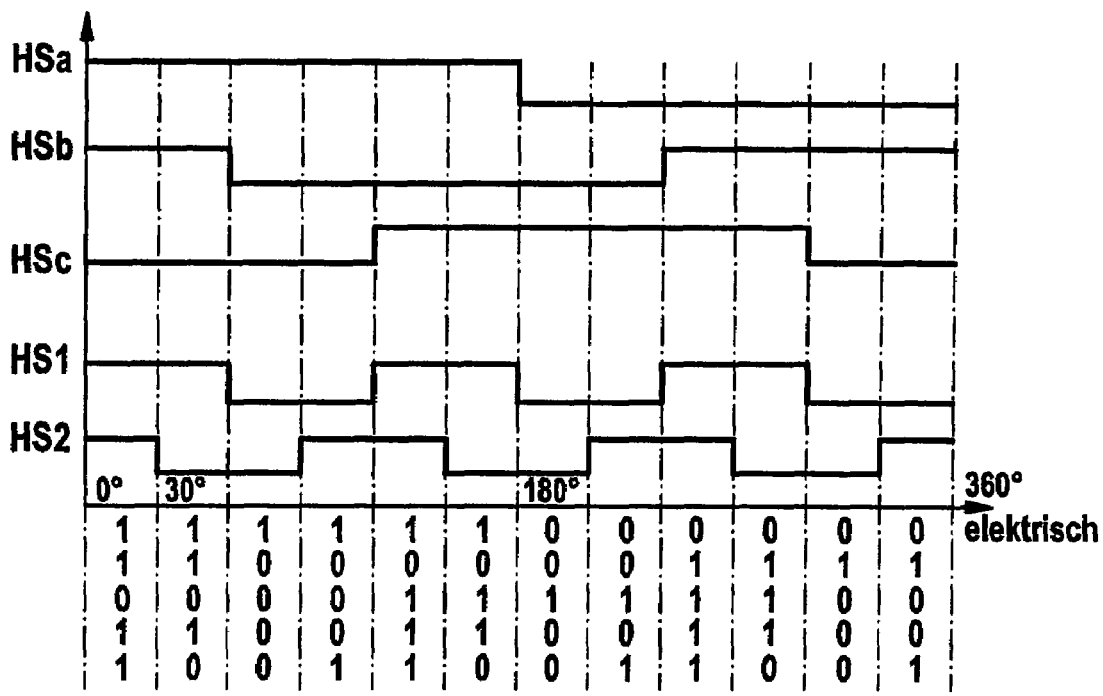

FIG. 2*b* shows a signal-time diagram of the output signals of Hall sensors 7 and of the additional Hall sensors 10. It can be seen that for each phase position of the rotor axle there is a clear output signal combination of the Hall sensors such that each position angle of the rotor axle is clearly defined by the individual states of the output signals of Hall sensors 7, 10. The clear assignment of the combination of the output signals of Hall sensors 7, 10, obviates the need for a reference run in which a defined zero point is approached.

Figure 3A:
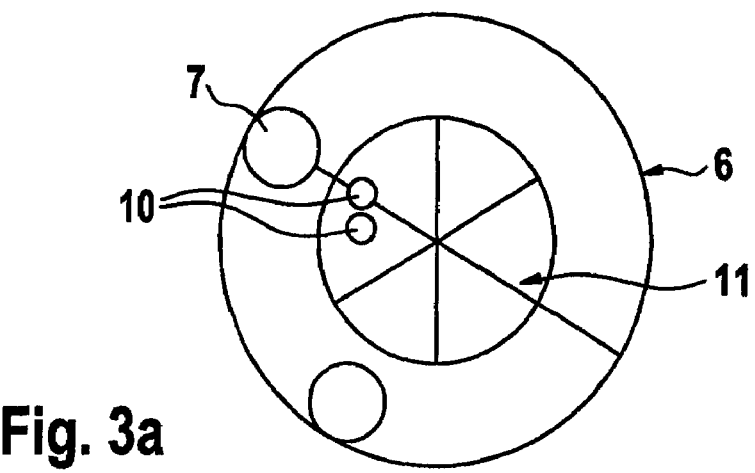
FIG. 3a shows a schematic representation of a position sensor system according to a preferred specific embodiment of the present invention.

FIG. 3*a* shows a schematic representation of a position sensor system according to a first specific embodiment of the present invention. Identical reference symbols as in FIGS. 1 and 2 correspond to elements of the same or similar function. In contrast to the conventional position sensor system, as it is shown in FIG. 2*a*, the position sensor system according to the present invention has only two first Hall sensors 7 on first one-pole pair sensor magnet set-up 6. The two first Hall sensors 7 are set up at an (electrical and physical) angle of 90° with respect to rotor axle 4 on first sensor magnet set-up 6. This allows for a clear assignment of the position angles of the rotor axle in angular segments of 90°.

Second Hall sensors 10 are attached to second sensor magnet set-up 11 in such a way that they have an angular offset of electrical 30°, one of the second Hall sensors 10 having the same physical angular position (with respect to the rotor axle) as one of the first Hall sensors 7. The other of the second Hall sensors 10 has in this respect an angular position that lies in the angular range of the angular offset of 90° of the first two Hall sensors 7, i.e., within the angular segment enclosed by the two first Hall sensors 7, which is formed by first Hall sensors 7. This makes it possible to provide a position sensor system for detecting an absolute electrical angular position of a rotor axle at a predetermined angular resolution that makes do with a reduced number of Hall sensors.

In place of a first one-pole pair sensor magnet set-up, the first sensor magnet set-up may also be provided with several pole pairs (number j). In this case, the two first Hall sensors are to be set up in such a way that they enclose an electrical angle of 90°. The electrical angle of 90° corresponds to a physical angle of 90° divided by the number j of the pole pairs of the first sensor magnet set-up. That is to say, in the case of two pole pairs of first sensor magnet set-up 6, one mechanical revolution corresponds to two electrical revolutions.

Figure 3B:
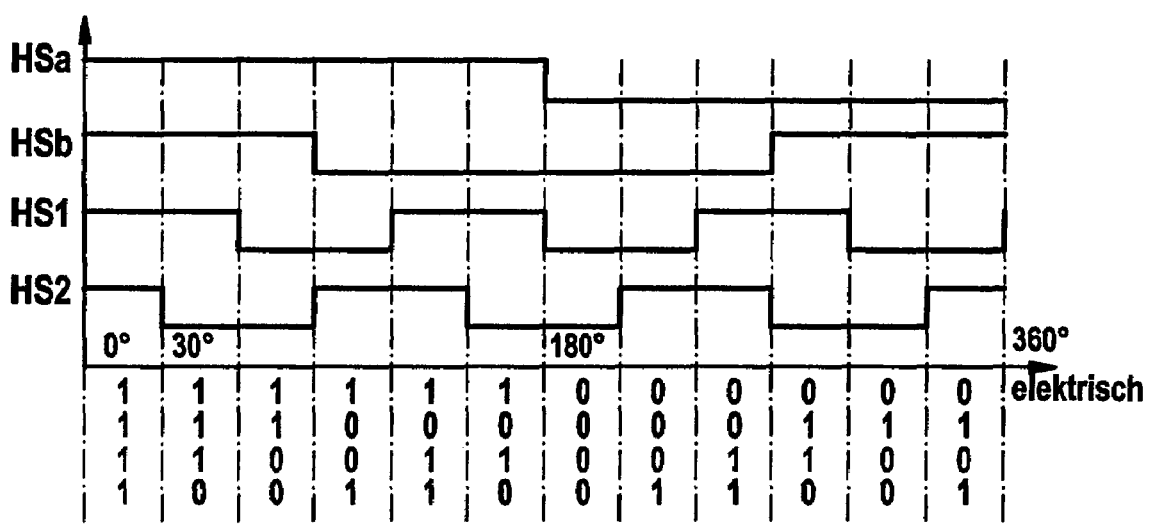

FIG. 3*b* shows a signal-time diagram, which displays the characteristic curve of the output signals of the Hall sensors of the specific embodiment of FIG. 3*a*. It can be seen that for each absolute angular position of the rotor axle there is a clear pattern of output signals such that the angular position can be detected when starting the motor without having to approach a reference position.

Figure 4:
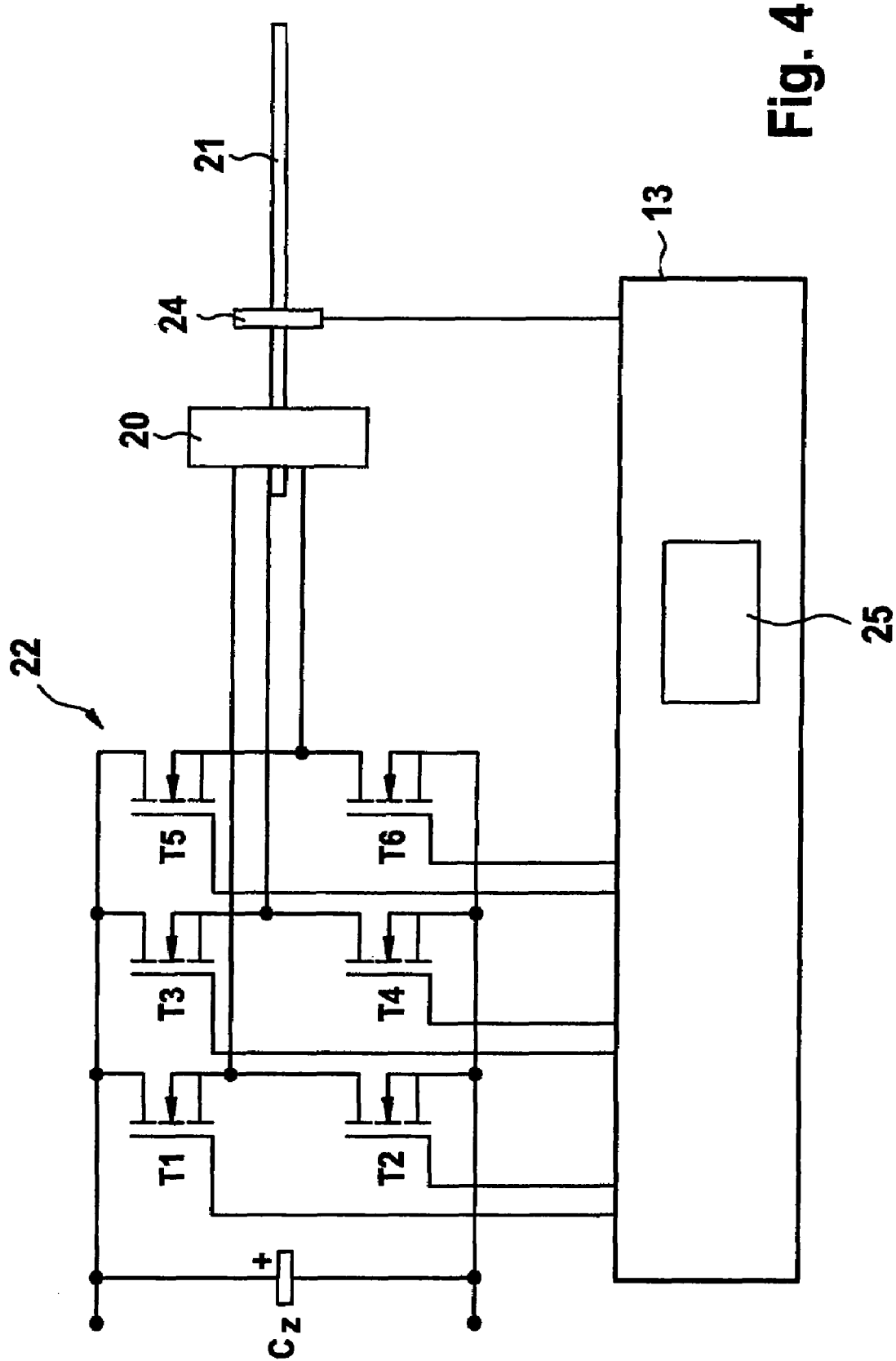
FIG. 4 shows a motor control system having an EC motor and a position sensor system according to another specific embodiment of the present invention.

FIG. 4 shows a motor control system having an EC motor 10 driving a rotor axle 21. A position sensor system, as was described, e.g., with respect to the specific embodiment of FIG. 3*a*, is set up on rotor axle 21. EC motor 10 is activated with the aid of an activation unit 22, which performs the commutation of the activation signals for EC motor 10. Activation unit 22 has six field-effect transistors T1 through T6, which are opened or closed as a function of the corresponding control signals of a control unit 13. Control unit 13 controls activation unit 22 as a function of sensor signals of a position sensor system 24. For this purpose, control unit 13 is designed in such a way that a change of the circuit states of the six transistors T1 through T6 is performed when there is a change of the angular position detected by position sensor system 24. This makes it possible to dispense with a trigger signal, by which the sensor values of the Hall sensors are detected in position sensor system 24. A change of a state of one of the Hall sensors thus effects a triggering of the activation signals for activation unit 22 such that it is possible to control the switching performance of the six transistors T1 through T6 as a function of a change of state. For this purpose, control unit 13 may have a logic unit 25, which logically combines the output signals of the Hall sensors and converts them into corresponding activation signals for activation unit 22.

What is claimed is:

1. A position sensor system for detecting an absolute electrical angular position of a rotor axle of an electric motor at a predetermined angular resolution, comprising:

a first Hall sensor device, which has a first sensor magnet set-up, set up on the rotor axle, having a number j of pole pairs and two first Hall sensors, which are physically set up with respect to the rotor axle at an angular offset of 90° divided by the number j of pole pairs so as to achieve a position angle resolution of an electrical angular position of 90°; and a second Hall sensor device, which has a second sensor magnet set-up, set up on the rotor axle, having n pole pairs and a number m of second Hall sensors, which are set up at an angular offset to one another with respect to the rotor axle, the set-up and the number n of pole pairs and the set-up and the number m of second Hall sensors being selected in order to detect angular segments at the predetermined angular resolution within the angular range of the angular offset.

2. The position sensor system as recited in claim 1, wherein one of the second Hall sensors is set up at a same angle with respect to the rotor axle as one of the first Hall sensors.

3. The position sensor system as recited in claim 2, wherein another one of the second Hall sensors is set up at an angular position with respect to the rotor axle which lies within the angular offset of the first Hall sensors.

4. The position sensor system as recited in claim 1, wherein one of the second Hall sensors is set up at a same angle with respect to the rotor axle as a boundary region between poles of one of the pole pairs of the first sensor magnet set-up.

5. The position sensor system as recited in claim 1, wherein the second sensor magnet set-up has three pole pairs and two second Hall sensors are provided, the two Hall sensors being set up at an electrical angle of 30° to each other with respect to the rotor axle.

6. The position sensor system as recited in claim 1, wherein an evaluation unit is provided, which is connected to the first and to the second Hall sensors in order to provide an absolute electrical angular position as a function of the output signals of the Hall sensors.

7. A motor control system, comprising:

an EC motor having a rotor axle; and a position sensor system, the position sensor system including:

a first Hall sensor device, which has a first sensor magnet set-up, set up on the rotor axle, having a number j of pole pairs and two first Hall sensors, which are physically set up with respect to the rotor axle at an angular offset of 90° divided by the number j of pole pairs so as to achieve a position angle resolution of an electrical angular position of 90°; and a second Hall sensor device, which has a second sensor magnet set-up, set up on the rotor axle, having n pole pairs and a number m of second Hall sensors, which are set up at an angular offset to one another with respect to the rotor axle, the set-up and the number n of pole pairs and the set-up and the number m of second Hall sensors being selected in order to detect angular segments at the predetermined angular resolution within the angular range of the angular offset; and an evaluation unit connected to the first and to the second Hall sensors in order to provide an absolute electrical angular position as a function of the output signals of the Hall sensors;

wherein the Hall sensor devices being set up on the rotor axle in such a way that a change of the detected absolute angular position ascertained by the evaluation unit is used as a trigger for a commutation of the EC motor.

* * * * *